United States Patent [19]

Jensen et al.

[11] Patent Number: 5,706,506
[45] Date of Patent: *Jan. 6, 1998

[54] METHOD AND APPARATUS FOR MANAGING RELATIONAL DATA IN AN OBJECT CACHE

[75] Inventors: Richard H. Jensen, Redwood City; Derek P. Henninger, Cupertino, both of Calif.

[73] Assignee: Persistence Software, Inc., San Mateo, Calif.

[*] Notice: The term of this patent shall not extend beyond the expiration date of Pat. No. 5,615,362.

[21] Appl. No.: 729,262

[22] Filed: Oct. 10, 1996

Related U.S. Application Data

[63] Continuation of Ser. No. 409,480, Mar. 22, 1995, Pat. No. 5,615,362, which is a continuation of Ser. No. 101,385, Aug. 2, 1993, abandoned.

[51] Int. Cl.$^6$ .................................................. G06F 17/30
[52] U.S. Cl. ......................................... 395/614; 395/445
[58] Field of Search ........................ 364/DIG. 1, DIG. 2; 395/425, 445, 600, 614

[56] References Cited

U.S. PATENT DOCUMENTS

| 4,930,071 | 5/1990 | Tou et al. ............................... | 364/300 |
|---|---|---|---|
| 4,947,320 | 8/1990 | Crus et al. .............................. | 395/600 |
| 5,212,787 | 5/1993 | Baker et al. ............................ | 395/600 |
| 5,220,657 | 6/1993 | Bly et al. ................................ | 395/425 |
| 5,235,701 | 8/1993 | Ohler et al. ............................. | 395/600 |
| 5,261,069 | 11/1993 | Wilkinson et al. ..................... | 395/425 |
| 5,263,167 | 11/1993 | Conner, Jr. et al. ................... | 395/700 |
| 5,295,256 | 3/1994 | Bapat ...................................... | 395/500 |
| 5,297,279 | 3/1994 | Bannon et al. ......................... | 395/600 |
| 5,305,389 | 4/1994 | Palmer .................................... | 382/1 |
| 5,313,629 | 5/1994 | Abraham et al. ...................... | 395/600 |
| 5,315,709 | 5/1994 | Alston, Jr. et al. .................... | 395/600 |

(List continued on next page.)

OTHER PUBLICATIONS

Stonebraker, M. et al., "The POSTGRES next-generation database management system", Comm of the ACM, vol. 34, No. 10, Oct. 1991, pp. 78–93.

Stone, C.M. et al., "Database Wars Revisited: How do you decide which type of database is best when even the experts can't agree?", BYTE, vol. 15, No. 10, Oct. 1990, p. 233.

*Primary Examiner*—Thomas G. Black
*Assistant Examiner*—Maria N. Von Buhr
*Attorney, Agent, or Firm*—Kenneth R. Allen; Townsend and Townsend and Crew LLP

[57] ABSTRACT

In an object-oriented application being executed in a digital computing system comprising a processor, a method and apparatus are provided for managing information retrieved from a structured database, such as a relational database, wherein the processor is used to construct a plurality of object instances, each of these object instances having its own unique object ID that provides a mapping between the object instance and at least one row in the structured database. The processor is used to construct a single cohesive data structure, called an object cache, that comprises all the object instances and that represents information retrieved from the structured database in a form suitable for use by one or more object-oriented applications. A mechanism for managing the object cache is provided that has these three properties: First, through a technique called key swizzling, it uses explicit relationship pointers between object instances in the object cache to reduce the volume of queries to the structured database. Second, it ensures that only one copy of an object instance is in the cache at any given time, even if several different queries return the same information from the database. Third, the mechanism guarantees the integrity of data in the cache by locking data appropriately in the structured database during a database transaction, flushing cache data at the end of each transaction, and transparently re-reading the data and reacquiring the appropriate locks for an object instance whose data has been flushed.

14 Claims, 10 Drawing Sheets

U.S. PATENT DOCUMENTS

| | | | |
|---|---|---|---|
| 5,317,742 | 5/1994 | Bapat | 395/700 |
| 5,341,478 | 8/1994 | Travis, Jr. et al. | 395/200 |
| 5,347,477 | 9/1994 | Lee | 364/709.11 |
| 5,386,527 | 1/1995 | Bosshart | 395/403 |
| 5,414,827 | 5/1995 | Lin | 395/462 |
| 5,423,019 | 6/1995 | Lin | 395/462 |
| 5,434,990 | 7/1995 | Moussavi et al. | 395/425 |
| 5,615,362 | 3/1997 | Jensen et al. | 395/614 |

METHOD AND APPARATUS FOR MANAGING RELATIONAL DATA IN AN OBJECT CACHE

This is a continuation of Ser. No. 08/409,480, filed Mar. 22, 1995, now U.S. Pat. No. 5,615,362, which is a continuation of Ser. No. 08/101,385, filed Aug. 2, 1993, now abandoned.

COPYRIGHT NOTIFICATION

A portion of the disclosure of this patent document contains material which is subject to copyright protection. The copyright owners have no objection to the facsimile reproduction, by anyone, of the patent document or the patent disclosure, as it appears in the patent and trademark office patent file or records, but otherwise reserve all copyright rights whatsoever.

MICROFICHE APPENDICES

Two appendices comprising a total of 1444 frames on 16 microfiche are included as part of the parent application of this application, which is incorporated herein by reference and made a part hereof. Appendix I contains the source code of Persistence™ version 1.3 released Jun. 15, 1993. It comprises 1358 frames on 14 microfiche. The Persistence™ software represents an embodiment of the method of the present invention. Appendix II contains a user's manual for Persistence™ version 1.2 released March 1993. It comprises 100 frames on 2 microfiche.

The source code in Appendix I represents unpublished work, Copyright ©1993 Persistence Software, Inc. All rights reserved. The user's manual in Appendix II is Copyright ©1993 Persistence Software, Inc. All rights reserved. For both Appendices I and II, copyright protection claimed includes all forms and matters of copyrightable material and information now allowed by statutory or judicial law or hereafter granted, including without limitation, material generated from the software programs which are displayed on the screen such as icons, screen display looks, etc.

BACKGROUND OF THE INVENTION

The invention relates to the interrelationship of databases, particularly relational databases, and object-oriented systems. More particularly, the invention relates to relationships between objects in object-oriented systems and descriptions of objects storable in field-delimited database structures. Field-delimited databases can structure data into fields which have common attributes. For example, relational databases can structure data into tables, each with columns and rows (in "n" dimensions) forming tuples, upon which certain operations in set algebra can be performed very conveniently.

Object-oriented applications (i.e., application programs) organize data and routines together into encapsulated units referred to as objects. Object-oriented applications lead to modular software systems which have increased flexibility and are easy to alter and maintain.

The difference between a relational database management system (RDBMS) and an object-oriented application is that an object "knows" what operations can be performed on its data, whereas an RDBMS only has a set of generic operations which can be performed on its tuples. For example, a "snow tire" object knows that it is related to an "axle" object and inherits from a "tire" object. In contrast, a relational database represents this information in three separate data tables with no explicit representation of the relationships between the tables. The tire table in a relational database might have foreign key information referring to the axle table, but this representation of the relationship between tire and axle is implicit. It is up to the application developer (i.e., computer programmer) to know about these relationships, what they mean, and how to handle them.

A relational database is stateless. One database query has no connection to the next query and no memory of the previous query. Thus there is a desire to provide in the application explicit references between different database queries, by grouping these results in a unified data structure in the application. More particularly, there is a desire to manage a unified, cohesive data structure of object instances, a data structure that represents the results of multiple queries to a structured database. It is further desired that this structure represent the relationships between these objects such that these relationships can be followed without the need to query the database for this information. Still further, it is desired that this structure be managed in such a way that the data in the structure is at all times consistent with the corresponding information in the database.

In known systems, the developer of an application program that communicates with a structured database typically hand-codes routines which store the information retrieved from database queries in small data structures. These data structures typically have no connection to one another. For example, a developer retrieves invoice information from the database in a first query and then retrieves the line items for that invoice from the database in a second query, and stores the results of these two queries in a single data structure, such as an array, in the application program. This data structure has no relation to any other data structure built as the result of other database queries. In particular, if another query had previously been made for some of the same information, there would be two copies of this information in the application program, thus providing a potential for inconsistent versions of the data in the program and in the database. That is, the two copies of the information in the program could be inconsistent with one another and both copies could be inconsistent with the information in the database. There would be no explicit reference between the program's two copies of the information.

As another example, suppose that a database contains personnel records for a company, and in particular contains tables that represent company departments and other tables that represent company employees. In known systems, a developer issues a separate database query each time he or she wishes to follow the relationship between an employee and department. Suppose the developer issues a database query which retrieves the department that is located in San Mateo. The result of this query is stored in a data structure, such as an array, in the application program. Next, suppose the developer issues a database query to determine which employees work in the department that is located in San Mateo. Suppose further that this query returns two rows from the Employee table, "Jane Smith" and "Sue Horn." These rows are placed into a data structure, such as an array, in the application program. Next, suppose that at some later time the developer wishes to determine what department Jane Smith works in. Because there are no references between the department data structure and the employee data structure, there is no link between Jane Smith and the San Mateo department. The developer will need to issue a third, separate query to the database to once again retrieve the San Mateo department.

In known systems, it is common to have hundreds or even thousands of such data structures in an application, each such structure having several potential relationships with other structures. This can lead to hundreds or thousands of unnecessary database queries. It will be appreciated that a mechanism for managing such structures which provides efficient performance and ensures consistency of data between such structures and the corresponding data in the database is desirable.

It is by no means a straightforward task to group the results of disparate queries into a cohesive data structure in an application. Among the principal problems are avoiding duplication of data within such a structure, ensuring consistency between data in the structure and data in the database by using database locks, and resolving the data integrity (coherency) issues associated with losing database locks when a database transaction is committed (i.e., when data is changed in the database). These problems are sufficiently complex that they have not been solved in the prior art. In known systems, developers typically work with small, atomic units of data which they create and then delete within the same routine to minimize such consistency problems.

If these problems of duplication avoidance, consistency, and data integrity can be solved, the cohesive data structure can provide a powerful tool for improving application performance. In particular, certain requests issued by the application can be resolved immediately by reference to the cohesive structure without any need to query the database.

What is needed is an automated method and system to manage information retrieved from a structured database (such as a relational database or other field-delimited database) in a format suitable for use by an application program (such as an object-oriented application) that works with the structured database, in a manner that speeds performance and improves robustness of the application.

Systems are known for manual mapping between objects in knowledge bases and database management systems. One approach is to employ a static class library as an interface between an object-oriented system and a relational database. An example is METHOD FOR INTEGRATING A KNOWLEDGE-BASED SYSTEM WITH AN ARBITRARY RELATIONAL DATABASE SYSTEM, U.S. Pat. No. 4,930,071 issued May 29, 1990 and assigned to IntelliCorp, Inc. of Mountain View, Calif. In static-type systems, objects can be extended to handle concepts such as relationships and inheritance, but they must be manually extended if they are to model complex real world structures. This limits their usefulness to building relatively simple object models from existing data, such as those used in rapidly building prototype systems. It is believed that there are commercial systems which use the static-type class approach. Among the candidates include "ProKappa" from IntelliCorp, "DB.H++" from Rogue Wave of Corvallis, Oreg., and possibly "Open ODB" from Hewlett Packard Company of Cupertino, Calif. and "UniSQL from UniSQL of Austin, Tex.

In known relational databases, the technique of "page caching" can be used to speed performance by keeping certain frequently referenced pages in program memory rather than on a storage device. (A page is a unit of information; in Unix systems, for example, a page is typically 2048 bytes.) Page caching has several limitations. First, pages are cached without any understanding of their semantic content. Second, cached pages are independent and cannot refer to other cached pages. Often, a database query must be performed in order to discover that a needed page is already in the cache. Third, database rows often take up only a small portion of a page, so that the memory allocated to the page cache is used inefficiently.

In known object-oriented databases, the concept of "swizzling" can be used in conjunction with page caching. In object-oriented databases, object instances can point to one another through virtual memory pointers. In "swizzling," virtual memory pointers between object instances are converted into physical memory pointers between cached pages. This technique is used, for example, by the ObjectStore system from Object Design of Burlington, Mass. In ObjectStore, object instances are identified by object IDs, representing virtual memory addresses which are generated by the system; the developer has no flexibility in defining these object IDs. As each page is brought into program memory, these object IDs are converted into physical memory references. Swizzling as taught in known systems is not applicable to relational databases, because rows in a database are identified by arbitrarily defined primary key values rather than by system-defined virtual memory address.

SUMMARY OF THE INVENTION

According to the invention, in an object-oriented application being executed in a digital computing system comprising a processor, a method and apparatus are provided for managing information retrieved from a structured database, such as a relational database, wherein the processor is used to construct a plurality of object instances, each of these object instances having its own unique object ID that provides a mapping between the object instance and at least one row in the structured database. The processor is used to construct a single cohesive object cache comprising all the object instances.

The method and apparatus of the invention provide a cohesive data structure, called an object cache, that represents information retrieved from a structured database in a form suitable for use by one or more object-oriented applications. Typically the object cache is stored in memory or in a storage device. A mechanism for managing the object cache is provided that has these three properties: First, through a technique called key swizzling, it uses explicit relationship pointers between object instances in the object cache to reduce the volume of queries to the structured database. Second, it ensures that only one copy of an object instance is in the cache at any given time, even if several different queries return the same information from the database. Third, the mechanism guarantees the integrity of data in the cache by locking data appropriately in the structured database during a database transaction, flushing cache data at the end of each transaction, and transparently re-reading the data and reacquiring the appropriate locks for an object instance whose data has been flushed.

The technique of key swizzling according to the invention converts foreign key information from the structured database into pointers in the object cache, thereby improving the performance of object-oriented applications that access the cache. In key swizzling, information requests from an object-oriented application are mapped into queries to the structured database, and the results of those queries are converted into object instances in the object cache. More particularly, implicit primary and foreign key references from the structured database are converted into explicit pointers between object instances contained in the object cache. Requests from an object-oriented application to navigate relationships between object instances in the cache are resolved by following these pointers. This reduces the volume of queries to the structured database.

The invention will be better understood by reference to the following detailed description in connection with the accompanying drawings.

DESCRIPTION OF A SPECIFIC EMBODIMENT

Figure 1:
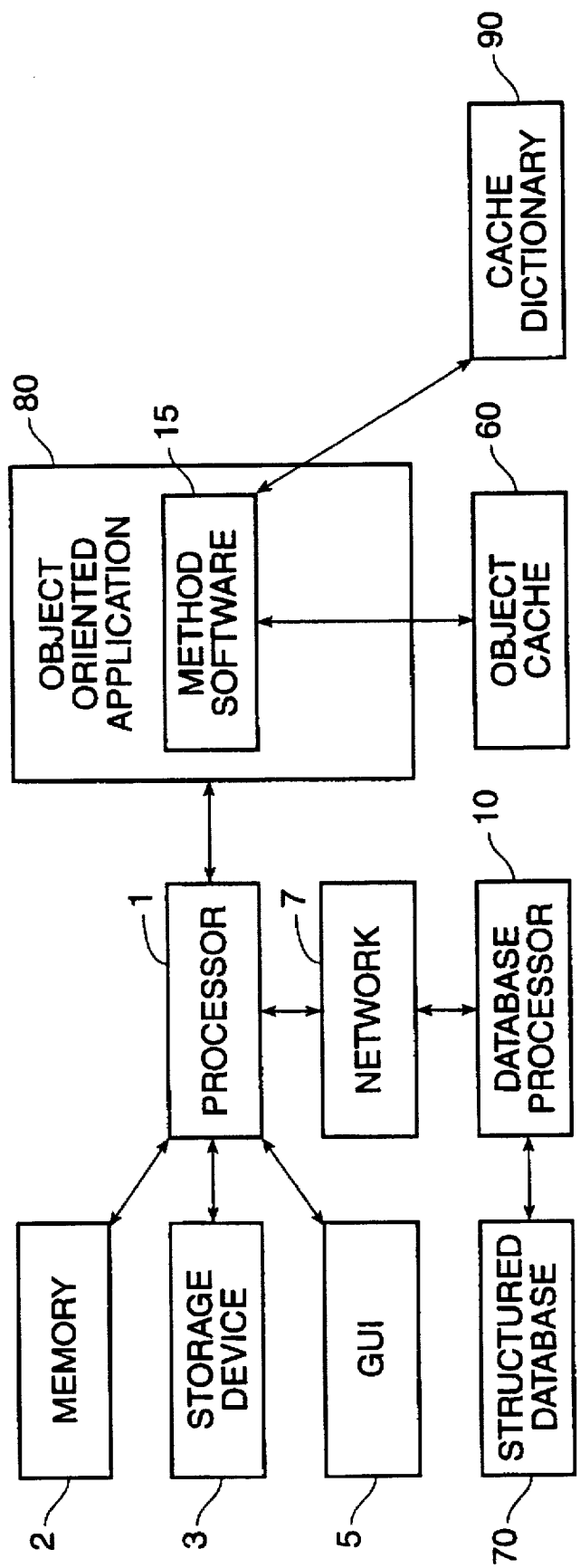
FIG. 1 is a block diagram of a computer system in accordance with the invention.

Following is a description of a specific embodiment of the method of the present invention. Section 1 sets forth terminology that is used in the remainder of the description. Section 2 provides a description of a computing system that can be used to support the steps of the method. Section 3 illustrates an example mapping between a structured database and an object cache according to the method. Section 4 describes an example of a mechanism for mapping information between a structured database and object instances of an object-oriented application according to a transform. Section 5 describes an overview of the method steps. Sections 6 through 9 give more detailed descriptions of certain method steps. Section 10 concludes the description.

1. Terminology

It is helpful to clarify the general meanings of terms used in connection with object-oriented systems.

1.1 Terminology relating to object-oriented systems

An "object class" is a set of data (attributes) and functional capabilities (routines) encapsulated into a single logical entity. For example, an employee class may be characterized by a telephone number attribute and a "hire_employee" routine.

An "object instance" is an embodiment (instantiation) of an object class. Instances are differentiated from one another by their attribute values, but not their routines (capabilities). For example, Jane Smith may be a first person-object instance and John Doe may be a second person-object instance. The term "object" is often used by itself to refer loosely to either an object class or an object instance, the difference being understood in context.

An "object-oriented application" is an operational computer program which when employed on an appropriate computer system uses a set of object instances that work in cooperation to perform useful work. For example, an object-oriented application could be built to manage personnel records for a company, including such operations as hire new employee or add an employee to a department.

An "object model" is a set of object classes that together form a blueprint for building an object-oriented application. Each object class of an object model can have attributes, inheritances, and relationships.

A "relationship" defines a link between two object classes. For example, an employee class may be related to the department class. Each specific employee, for example, "Jane Smith," would have a relationship with a specific department, such as "engineering." Relationships can be one-to-one, one-to-many, or many-to-many. An example of a one-to-one relationship can be a relationship between employee and parking place such that each employee can have a single parking place. An example of a one-to-many relationship can be a relationship between department and employee such that each department can employ multiple employees. An example of a many-to-many relationship can be a relationship between employee and project such that each employee serves on multiple projects, and each project consists of multiple employees.

"Attributes" are data elements of object classes which are expressed through particular values in object instances. For example, a person class can have the attribute "name", and a particular person instance can have the name value "Jane Smith."

An "object ID" is used to uniquely identify each object instance. The object ID can generated in one of two ways. It can be generated by the application, which can automatically assign a unique object ID for each new object instance. Alternatively it can comprise a set of attributes that are guaranteed in the object model to always form a unique set of values for an instance. In this case, the create routine will require a unique set of attributes in order to create a new object instance.

A "routine" is a functional capability associated with an object class. For example, the routine "hire_employee" could be used to create a new employee instance.

"Inheritance" represents a specialization of an object class in which the specialized class shares all of the attributes and routines of parent classes. Thus the employee class can inherit certain attributes, such as name, from the person class. In this case, the person class is called the "parent" of the employee class, and the employee class is called the "child" of the person class.

1.2 Terminology relating to structured databases

A "structured database" comprises tables, each table consisting of a set of rows, each row being delimited into a set of columns. One example of a structured database is a relational database containing an employee table. This employee table can further contain a set of rows, each row consisting of two data columns: social security number and name.

Within each database table are columns that can be of three types: primary key, foreign key, and data. A primary key column is employed to uniquely identify each row in a table. Multiple primary key columns can also be used in combination to uniquely identify each row in the table; an example is a combination of a first name column and a last name column. A foreign key column (or columns) can be employed to logically connect a row in a given table to a unique or specific row in another table. A data column is employed to store information that is neither a primary key nor a foreign key.

A "database schema" defines a particular configuration of tables and columns for each table.

A "transform" describes a mapping between elements of an object model and elements of a database schema.

A "query" is an operation on a structured database which returns information from the database based on some criteria. For example, the query SELECT*FROM employee WHERE location='California' can return all rows from the employee table of a relational database whose Location column has a value of 'California'.

Queries can be, for example, written in the SQL (Structured Query Language) syntax, which is most commonly used with relational databases.

A "transaction" is a mechanism provided by the structured database to ensure that a specified group of operations upon the database either succeed as a unit or fail as a unit. The developer begins a transaction with a "begin" command, can issue a number of other database commands within the transaction, such as queries, updates, inserts, and deletes, and explicitly ends a transaction with a "commit" command.

A database "lock" is a mechanism provided by the structured database to prevent two applications from simultaneously updating the same rows in the database. A lock is "acquired" during a query, for example by appending the clause "FOR UPDATE" to the query. For example, the query SELECT*FROM employee WHERE location='California' FOR UPDATE locks all rows in the employee table of a relational database whose Location column has a value of 'California'. Locks are valid only within a transaction. When a transaction is committed, all locks acquired within that transaction are released.

1.3 Terminology relating to object cache

An "object cache" is a data structure that comprises one or more object instances mapped from a structured database and used by an object-oriented application. The object instances in the object cache can explicitly refer to each other through pointers. A "pointer" is an object instance attribute which contains the address, such as a physical memory address, of another object instance. Additionally, an object cache can further comprise a cache dictionary in some embodiments.

"Navigate" means to follow the relationship link between two object instances.

A "request" is a operation or action initiated by an object-oriented application. The method of the invention converts requests into operations on the object cache in the case of a navigational request, or into queries to the database. For example, an object-oriented application can issue a request to navigate the relationship between an employee instance and its related department instance.

"Key swizzling" refers to a step in the method of the invention that converts an implicit reference between rows of a structured database, as represented by a foreign key in one database table and a primary key in another database table, into explicit pointers between related object instances in an object cache.

2. System Overview

FIG. 1 illustrates a digital computing system suitable to implement the method of the present invention in a typical embodiment. The system comprises computing hardware and related system software that together support the execution of method software 15, which is software that carries out the steps of the method of the invention. More particularly, the system of FIG. 1 comprises a processor 1 that is coupled to a memory 2, a storage device 3 (such as a hard disk), and a user interface such as a graphical user interface 5.

The processor 1 can also be coupled to one or more structured databases comprising software and associated data. In the illustrated embodiment there is one structured database 70. Structured database 70 has its own associated hardware including a database processor 10 which communicates via network 7 with processor 1. In other embodiments the structured database 70 is a software entity that is executed by processor 1, and network 7 is not present. It will be appreciated by those of skill in the art that a wide range of computing system configurations can be used to support the method of the present invention including, for example, configurations that employ multiple processors and multiple databases.

Method software 15 is incorporated in object-oriented application 80 which is executed by processor 1. Method software 15 implements capabilities for mapping between structured database 70 and object cache 60. In particular, method software 15 processes requests from object-oriented application 80 to retrieve information from structured database 70 and map that information into object cache 60; to navigate relationships between objects in object cache 60; to delete references to object instances in object cache 60; to commit transactions in structured database 70; and to begin transactions in structured database 70.

Method software 15 makes use of certain components that are also shown in FIG. 1. Among these components are an object cache 60 and a cache dictionary 90.

The method uses pointers between object instances in object cache 60 to follow relationships between object instances rapidly in response to requests from object-oriented application 80. Using the object cache 60, the method reduces the number of queries sent to structured database 70, thereby increasing performance. Object cache 60 can be stored in memory 2, in storage device 3, or in some combination of memory 2 and storage device 3. Typically, access to object cache 60 is much faster than access to structured database 70. It will be appreciated that in some embodiments additional object-oriented applications besides object-oriented application 80 can share object cache 60.

The method uses cache dictionary 90 to locate object instances in object cache 60 based on the object ID for a particular object instance. As each new object instance is added to object cache 60, the object instance is registered in cache dictionary 90. More particularly, the object instance's object ID is stored in the cache dictionary 90 along with the location at which the object instance is stored in object cache 60. The cache dictionary can, for example, be organized in a hash table. Given an object ID, the method uses the cache dictionary 90 to determine whether the object instance corresponding to that object ID is currently present in object cache 60. If so, the method returns a reference, for example a pointer, to the object instance's location in object cache 60.

3. Mapping Between Structured Database and Object Cache

Figure 2:
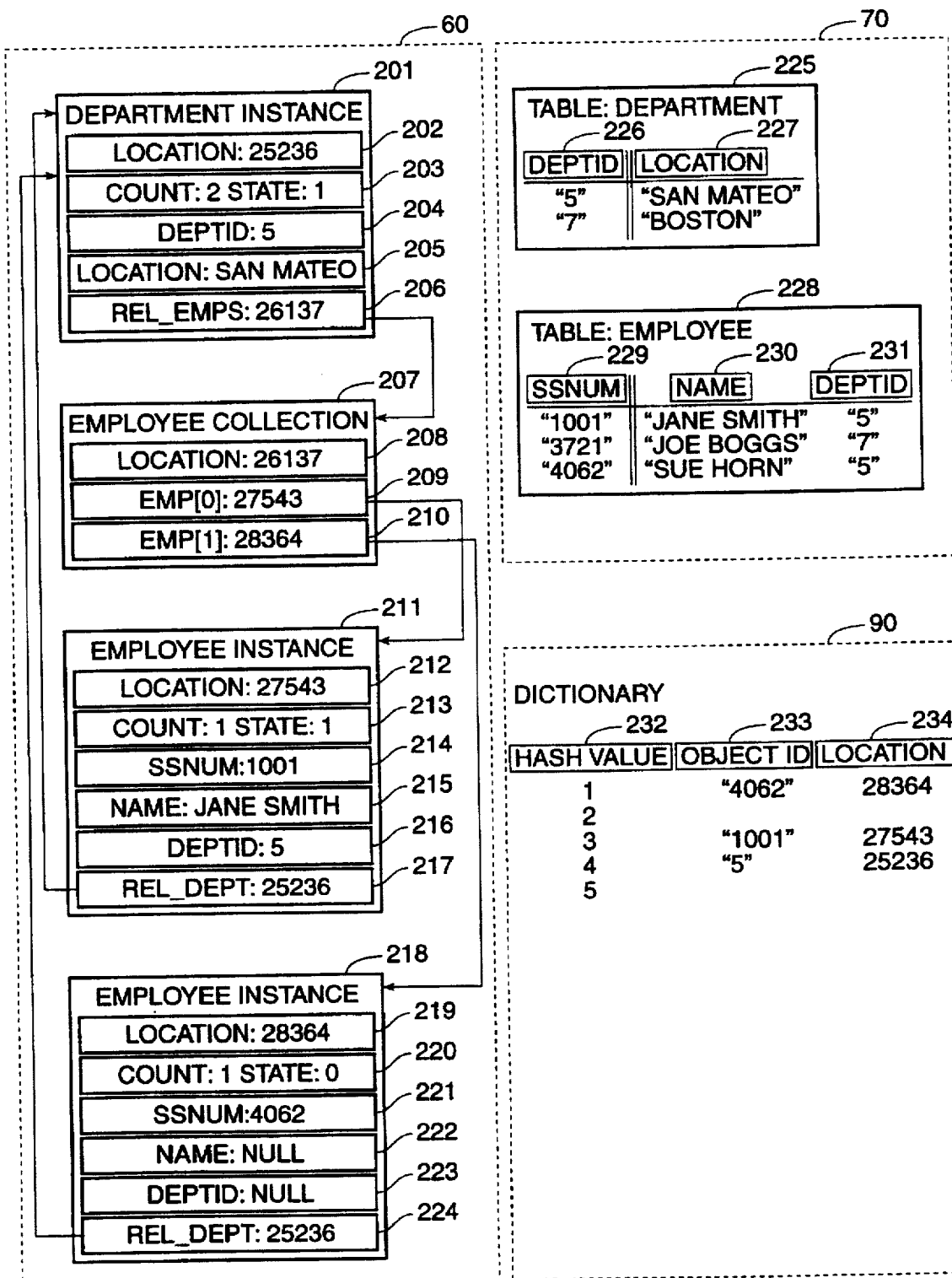
FIG. 2 is a schematic diagram representing the correspondence between a structured database and an object cache.

FIG. 2 is a schematic diagram representing the correspondence between structured database 70, object cache 60, and cache dictionary 90 for an example object-oriented application. Object cache 60 contains three object instances, department instance 201 and employee instances 211 and 218 The object cache also contains an employee collection 207, which contains references to all the employee instances related to department instance 201.

In this example, each object instance can be referenced through a pointer to its memory location. For example, department instance 201 is physically located in memory location 25236 as shown by label 202 of FIG. 2. Employee instance 211 is stored at memory location 27543 (label 212), and employee instance 218 is stored at memory location 28364 (label 219), and employee collection 207 is stored at memory location 26137 (label 208).

Each object instance contains an object ID which is an attribute or set of attributes that uniquely define that object instance. For example, department ID 204, which has a value of 5, is the object ID for department instance 201, and SSNum 214, which represents a social security number and has a value of 1001, is the object ID for employee instance 211.

Each object instance contains a pointer for each of its relationships. For the one-to-many relationship between department instance 201 and its related employee instances, department attribute 206 points to (contains the memory address of) employee collection 207. (An attribute that contains the address of another data structure, such as an object instance, is called a pointer.) Employee instance 211 contains an attribute 217 that points to department instance 201, and employee instance 218 contains an attribute 224 that points to department instance 201.

In the illustrated embodiment, each object instance also contains a reference count and state. Department instance 201 has attribute 203 which contains a reference count of 2, indicating that two variables in the object-oriented application refer to department instance 201, and a state of 1, indicating that the data associated with department instance 201 is valid, i.e., has been read since the last database transaction was committed. Employee instance 211 contains a reference count of 1 and a state of 1 in attribute 213. The reference count of 1 indicates that only one variable in the object-oriented application refers to employee instance 211. Employee instance 218 contains a reference count of 1 and a state of 0 in attribute 220. The state of 0 indicates that the data associated with employee instance 218 has been flushed, i.e., has not been read since the last database transaction was committed. The reference count and state can be omitted in some embodiments.

FIG. 2 further illustrates key swizzling in which foreign key 231 ("DeptID") in employee table 228 of structured database 70 is mapped to pointers 206, 209, 210, 217, and 224. The method uses these pointers to process requests for navigation between object instances in object cache 60, thereby reducing the number of queries made to structured database 70.

The method swizzles, or converts, foreign key information from structured database 70, which represents implicit information about a relationship, into pointers between object instances stored in object cache 60. Because these pointers are bi-directional, the relationship can be traversed in either direction without requiring a database query. For example, foreign key column 231 in employee table 228 acts as an implicit "one-way pointer" between each row in employee table 228 and a corresponding row in department table 225.

Key swizzling can provide significant performance benefits for data-intensive applications, for example a personnel records management application in which each person and department of a company can be represented by an object instance in the object cache. Here is an example of how this can work:

1. The developer logs into the database and retrieves an object instance (that is, retrieves database information about an object instance), for example, the San Mateo department instance 201 as shown in FIG. 2. When the object instance is retrieved, pointers (in this case, pointer 206 for department instance 201) are set up that point to related objects. Since those objects have not yet been read, the pointers are initialized to NULL.

2. Next, the developer retrieves additional object instances related to the first object, for example, employee instances 211 and 218 related to department instance 201. At this point, pointer 206 of department instance 201 is set to point to employee collection 207, which in turn points to employee instances 211 and 218. Also at this point, pointer 217 of employee instance 211 is set to point to department instance 201 and pointer 224 of employee 218 is set to point to department instance 201. Thus bi-directional pointers are set up between the department instance and its related employee instances. In effect, the foreign key attributes that identify a relationship in the database are converted, or "key swizzled," into pointers between object instances in the object cache 60.

3. The pointers between object instances 201, 211, and 218 can be navigated very quickly, producing performance gains of 10 to 100 times when compared to the performance of the structured database standing alone.

Cache dictionary 90 contains pairs of object ID values 233 and memory locations 234 organized according to the hash values 232 obtained by performing a hash function on each object ID. Each object class defines its own hash function based on the attributes that make up its object ID. In the example of FIG. 2, the object ID value "4062" corresponding to employee instance 218 is assigned the hash value of 1 by its hashing function. Given an object ID of "4062," the method of the invention can perform a lookup in the cache dictionary 90 to determine whether the corresponding object instance is in the object cache 60. In this example, the result of this lookup is a reference to employee instance 218, in particular, a pointer of value 28364. It will be appreciated by those of skill in the art that many other implementations can be used for the dictionary, including but not limited to implementations that handle hash collisions, implementations that use extensible hashing, and implementations that do not use a hash table.

4. Mapping Mechanism

The present invention presupposes that there is some mechanism in object-oriented application 80 for mapping information between structured database 70 and object instances of object-oriented application 80. One such mechanism is described in U.S. patent application Ser. No. 08/095,322, METHOD AND APPARATUS FOR GENERATION OF CODE FOR MAPPING RELATIONAL DATA TO OBJECTS, Attorney Docket No. 16186-1, filed Jul. 21, 1993, invented by Derek P. Henninger, Richard H. Jensen, and Christopher T. Keene. This mechanism uses an object model, database schema, and transform to define a mapping between the structured database and object instances of the application. Given these three inputs, it is possible to construct an object-oriented application that can retrieve information from the structured database according to the semantics of the object model. In particular, the application can retrieve a single object instance (that is, retrieve database information corresponding to a single object instance) using an object ID value, and can retrieve object instances related to a given object instance by following the relationship semantics of the object model and using foreign key mappings as specified by the transform. Construction of the object-oriented application according to the object model, database schema, and transform can be automated as is further disclosed in the above-mentioned patent application, or can be carried out manually by a developer.

Figure 3:
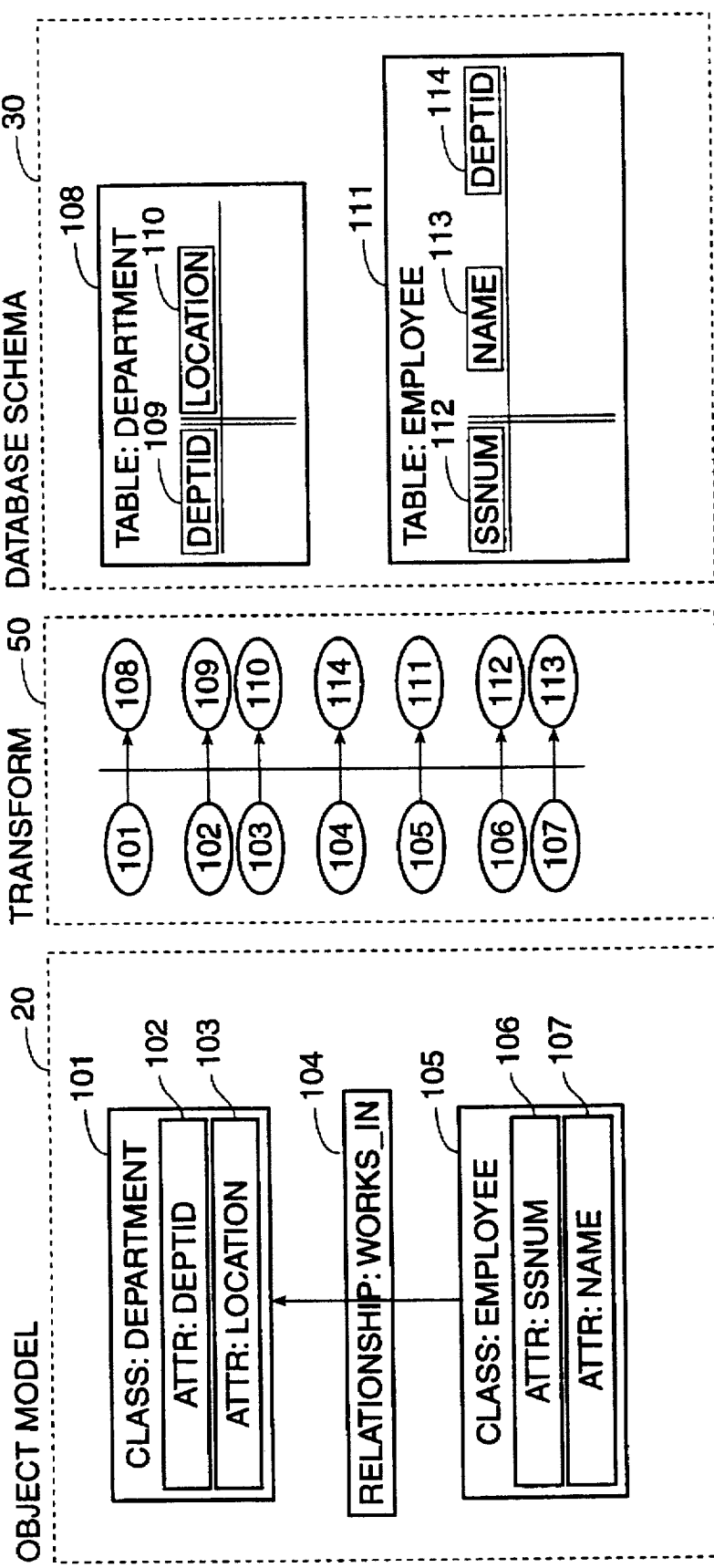
FIG. 3 is a schematic diagram representing an example of a mapping between a database schema and an object model by means of a transform.

FIG. 3 is a schematic diagram representing the correspondence between a database schema 30 and an object model 20 by means of a transform 50 for an example object-oriented application. The object model 20 is used to describe the structure of the object-oriented application, including the structure of each object in the application and the relationships and inheritances between objects. In FIG. 3, object model 20 represents the structure of a personnel records management application. For purposes of this example, the object model 20 has two object classes, department class 101 and employee class 105. The object model 20 contains attributes 102, 103 for the department class 101, and attributes 106, 107 for the employee class 105. The object model 20 also contains one relationship, called works_in (relationship example 104). The works_in relationship expresses the idea that each department has some number of related employees that work in the department.

The transform 50 describes a mapping between elements of the object model 20 and elements of the database schema 30. Specifically, the transform 50 describes four kinds of mappings. First, there is the mapping between the attributes that make up an object ID for an object instance and the primary key columns in one or more database tables. For example the transform 50 maps the object ID attribute 102 to primary key column 109. Second, there is a mapping between an object class attribute in a object model and a column or columns in a database. For example, the transform 50 maps attribute 107 to column 113. Third, there is the mapping between a relationship in an object model and a foreign key column or columns in a database table. For example, the transform 50 maps relationship 104 to column 114.

In other embodiments of the invention, the mechanism for mapping information between a structured database and object instances of an object-oriented application can comprise appropriate code written by a developer who is familiar with object-oriented systems and structured databases, using appropriate programming language tools such as the C++ language. Such code can be written without the benefit of an abstract object model, database schema, and transform. Still other embodiments will be apparent to those of skill in the art.

5. Method Overview

Figure 4:
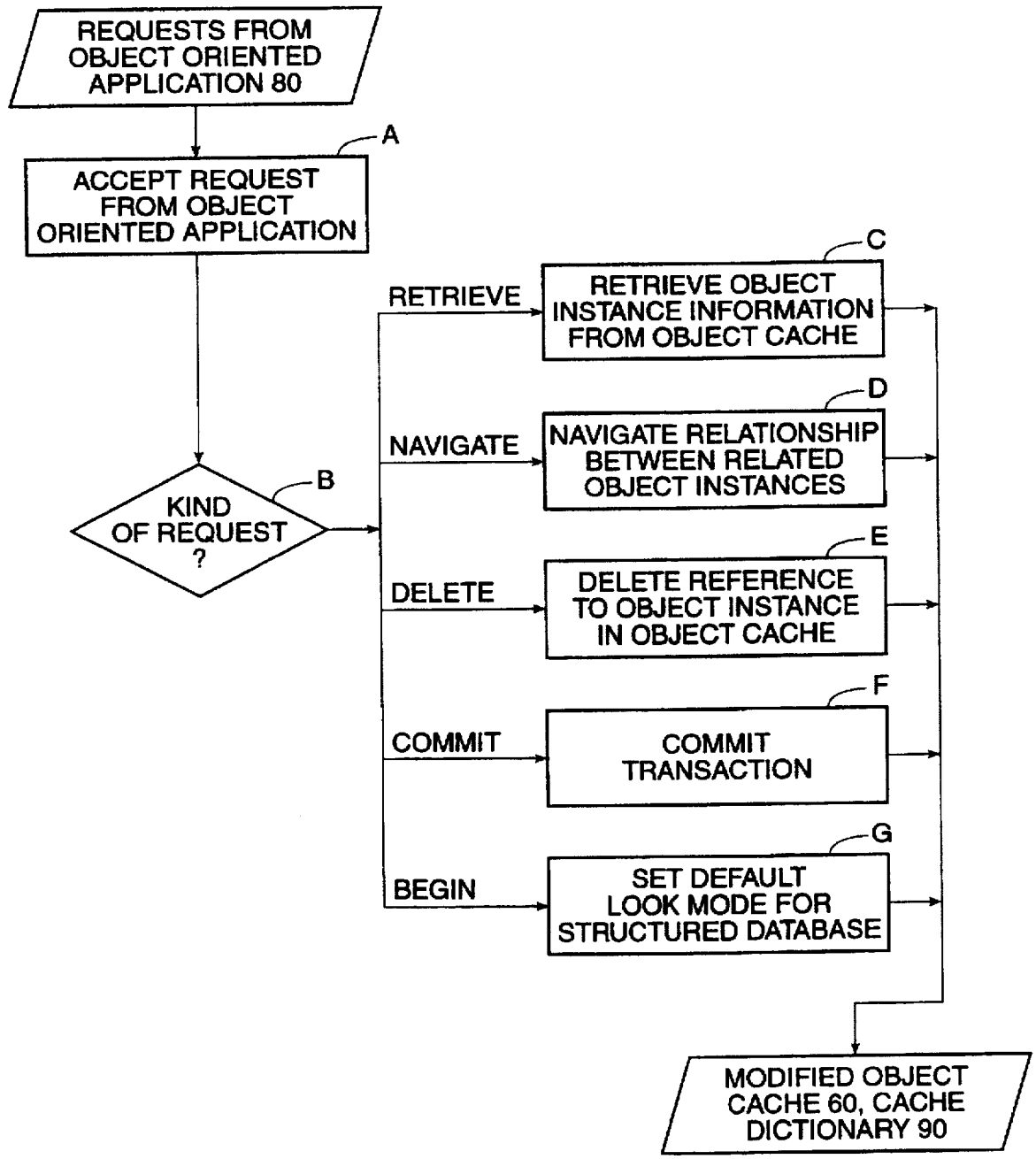
FIG. 4 is a flow chart representing an overview of the method steps.

The flow chart of FIG. 4 provides an overview of the operation of the method of the invention. The method can, for example, be embodied in code organized into routines for an object-oriented application.

According to the invention, the method accepts a request from object-oriented application 80 (Step A). This request can, for example, be in the form of calls to the routines that embody the method. These calls can, for example, be issued by object-oriented application 80 in response to a command or commands from the developer.

Next the method determines the kind of request that has been accepted (Step B). The method supports the following operations: retrieving object instances, navigating relationships between object instances, deleting references to object instances, committing database transactions, and beginning database transactions.

The request is then processed according to its kind. If the request is a request to retrieve an object instance or instances (Step C), the method transparently makes the appropriate query or queries to structured database 70, and maps the resulting information from structured database 70 into a corresponding object instance or instances in object cache 60.

If the request is a request to navigate a relationship between object instances (Step D), the method first attempts to follow pointers between instances in the object cache 60. If these pointers have been set, the method returns the related object instance or instances directly from object cache 60 without querying structured database 70. If these pointers have not been set, the method queries structured database 70 for the appropriate information, maps the resulting information from structured database 70 into a corresponding object instance or instances in object cache 60, and sets bi-directional pointers between the related object instances.

If the request is a request to delete a reference to an object instance (Step E), the method decrements a reference counter within the object instance. If, after decrementing, this reference counter is zero, the method removes the object from the object cache and from the cache dictionary.

If the request is a request to commit a transaction (Step F), the method sets the state of all object instances in the object cache to flushed, indicating that the data for these instances must be re-read from the database and the corresponding locks reacquired to ensure consistency of the data in the cache.

If the request is a request to begin a transaction (Step G), the method sets the default type of locking to be used within that transaction. This default locking mode will be applied to appropriate queries to the database to ensure that rows in the database remain consistent with their corresponding object instances in the object cache.

Step C is more fully described with reference to FIGS. 5 and 6 below. Steps D, E, and F are described more fully below with reference to FIGS. 7, 8, and 9, respectively.

The result of processing a request to retrieve an object instance, navigate a relationship between object instances, delete a reference to an object instance, or commit a transaction is a modified object cache 60. For example, object instances can be added to or deleted from the cache. As another example, reference counts for object instances in the cache can be changed. In some cases the cache dictionary 90 is modified as well by these requests. A request to begin a transaction has no effect on individual object instances in the object cache, but it does affect the cache as a whole, in that affects subsequent database operations.

6. Object Instance Retrieval

The code to retrieve an object instance comprises a routine that maps information requests from an object-oriented application into lockups in the object cache. Lookups that fail force queries to the structured database.

Figure 5:
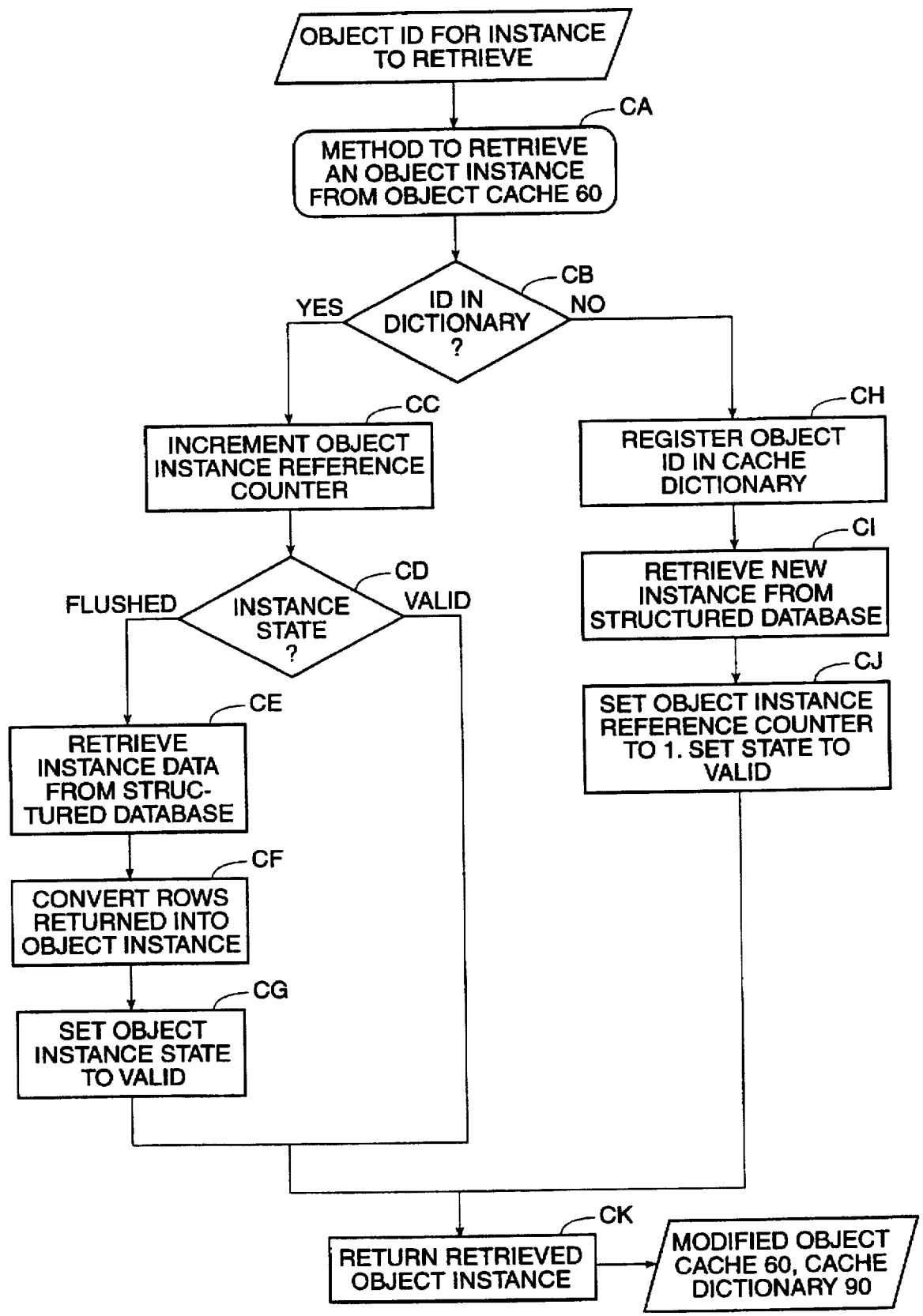
FIG. 5 is a flow chart representing the process for retrieving information from the object cache.

FIG. 5 illustrates how the method processes a request to retrieve an object instance from object cache 60 (Step CA) in one embodiment. The method first determines whether the object instance is already in object cache 60 by performing a lookup on cache dictionary 90 (Step CB). This lookup can, for example, take the form of a lookup in a hash table. The result of this lookup is either a reference to an existing object instance in the object cache which corresponds to the object ID used in the lookup, or a NULL value, which indicates that the requested object instance is not present in the cache.

In the case that the lookup is successful (Step CC), the method increments a reference counter associated with the object instance returned by the dictionary lookup. This reference counter indicates the number of variables within the object-oriented application 80 which refer to or depend upon this particular object instance. Through the use of a reference counter, the method allows multiple variables in the application to refer to the same object instance in the cache, thereby avoiding having duplicate information in the object cache.

Next, the method determines the state of the retrieved object instance (Step CD). If the state is flushed (Step CE), indicating that the data in the object instance has not been updated since the last database transaction was committed, the method queries the database using the default locking mode as specified by the most recent request to begin a transaction. The query (or queries) retrieves the appropriate information to update the data in the object instance and reacquires the appropriate database locks. The method then uses the row or rows returned to update the information in the object instance (Step CF) and sets (assigns) the state of the object instance to valid (Step CG), indicating that the data in the object instance is valid, that is to say, guaranteed to be consistent with the corresponding information in the database.

In the case that the dictionary lookup is unsuccessful, the object instance is registered in the cache dictionary 90 (Step CH). For example, the object ID of the object instance can be inserted into a hash table along with a reference to the memory location at which the object instance is stored. Next, the method queries the structured database to retrieve information that will be used to add a new object instance to the object cache (Step CI). This is more fully described below with reference to FIG. 6. Once the object instance has been retrieved (that is, the information has been retrieved from the database and used to create a new object instance in the cache), the method sets the reference counter for this object instance to 1 (Step CJ), indicating that only one program variable in the application refers to this instance, and sets (assigns) the state of the object instance to valid, indicating that the data in the object instance is valid.

Once the object instance has been retrieved from the cache, the method returns a reference to that object instance (Step CK) for further processing by the object-oriented application. The result of these steps is a modified object cache 60, either through changes to existing instances in the cache or through addition of a new instance to the cache and its registration in the cache dictionary 90.

6.1 Retrieval from Structured Database

Figure 6:
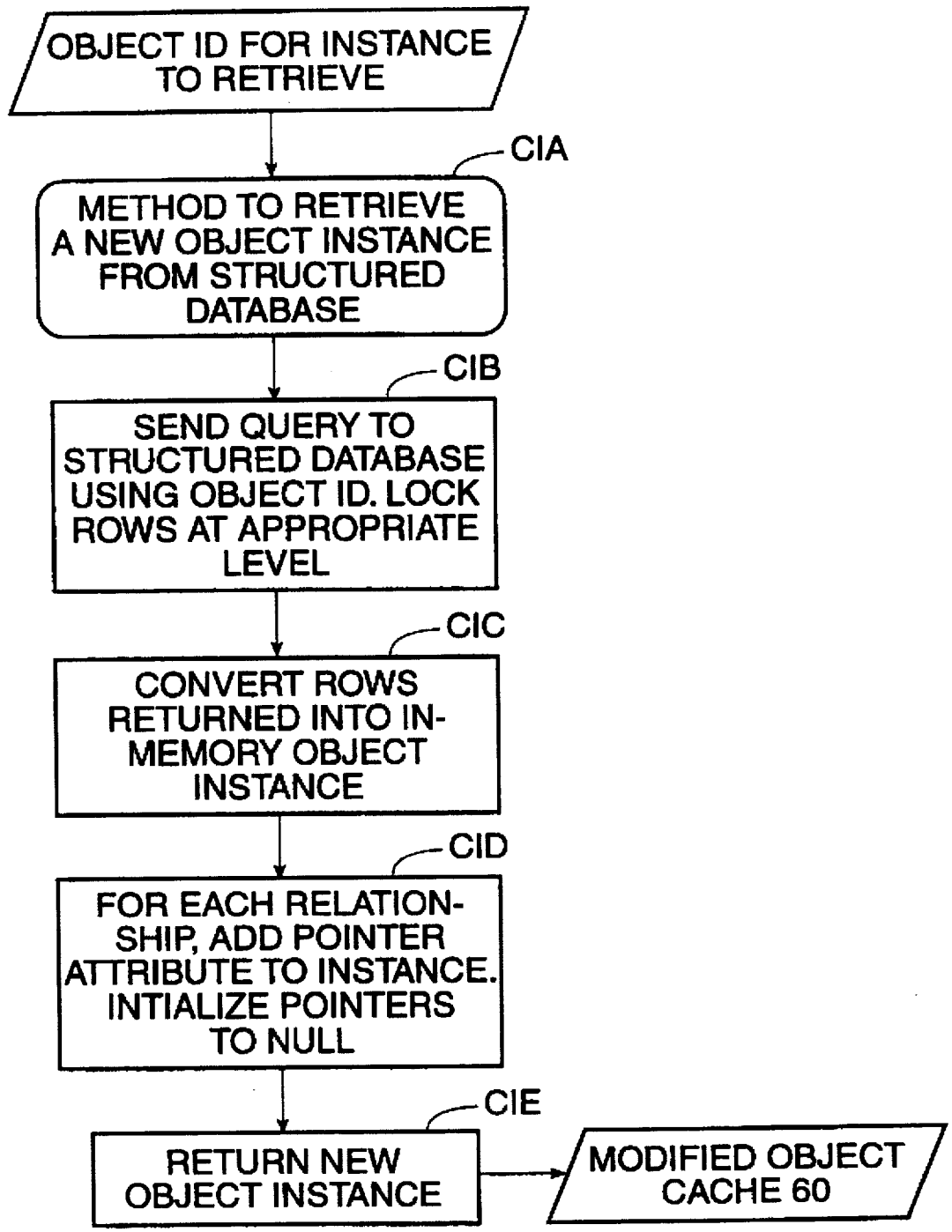
FIG. 6 is a flow chart representing the process for retrieving an object instance from a structured database.

FIG. 6 illustrates in more detail the step of retrieving a new object instance from the structured database (Step CI in FIG. 5). The method accepts an object ID for the object instance to be retrieved from the database (Step CIA). The attributes that make up the object ID map to one or more corresponding primary key columns in the database.

The method sends a query or queries to the structured database using the object ID and using the appropriate locking mode as specified by the most recent request to begin a transaction (Step CIB). The resulting rows are converted into an object instance in the cache (Step CIC), for example, by using the mapping mechanism described above with reference to FIG. 3.

For each relationship that the new object instance can be involved in, the method adds a corresponding relationship pointer attribute to the new instance, initializing this relationship pointer attribute to NULL to indicate that the corresponding relationship information has not yet been read from the database (Step CID). Examples of such relationship pointer attributes are shown in FIG. 2, for example, attribute 206 of department instance 201, which represents the relationship between a department and a collection of employees, and attribute 217 of employee instance 211, which represents the reciprocal relationship between an employee and a department.

In an embodiment in which the mapping mechanism described above with reference to FIG. 3 is used, the mapping mechanism itself can determine what relationships the new object instance can be involved in, and thus can determine what pointer attributes are to be added to the object instance by referring to the object model 20. In embodiments in which the mapping mechanism comprises appropriate code written by a developer, the developer must specify in the code what relationship attributes are to be added. Other embodiments will be apparent to those of skill in the art.

Once the new object instance has been created, a reference to the instance is returned to the calling routine (Step CIE).

7. Object Relationship Navigation

The process of navigating relationships between object instances in the object cache uses key swizzling to convert implicit primary and foreign key references from the structured database into explicit pointers between object instances contained in the object cache. Navigational requests from an object-oriented application are resolved by following these pointers, thereby providing improved performance by reducing queries to the structured database.

Relationship navigation presupposes that there is some mechanism in object-oriented application 80 for mapping information between structured database 70 and object instances of object-oriented application 80. In one embodiment, this mechanism can be as described in U.S. patent application Ser. No. 08/095,322, METHOD AND APPARATUS FOR GENERATION OF CODE FOR MAPPING RELATIONAL DATA TO OBJECTS, Attorney Docket No. 16186-1, filed Jul. 21, 1993, invented by Derek P. Henninger, Richard H. Jensen, and Christopher T. Keene. This mechanism uses an object model, database schema, and transform to define a mapping between the structured database and object instances of the application. In particular, the transform describes how to map foreign and primary key columns in the database into relationships in the object model. An example of such a mapping has been illustrated above with reference to FIG. 3. It will be appreciated that other embodiments are possible.

Figure 7A:
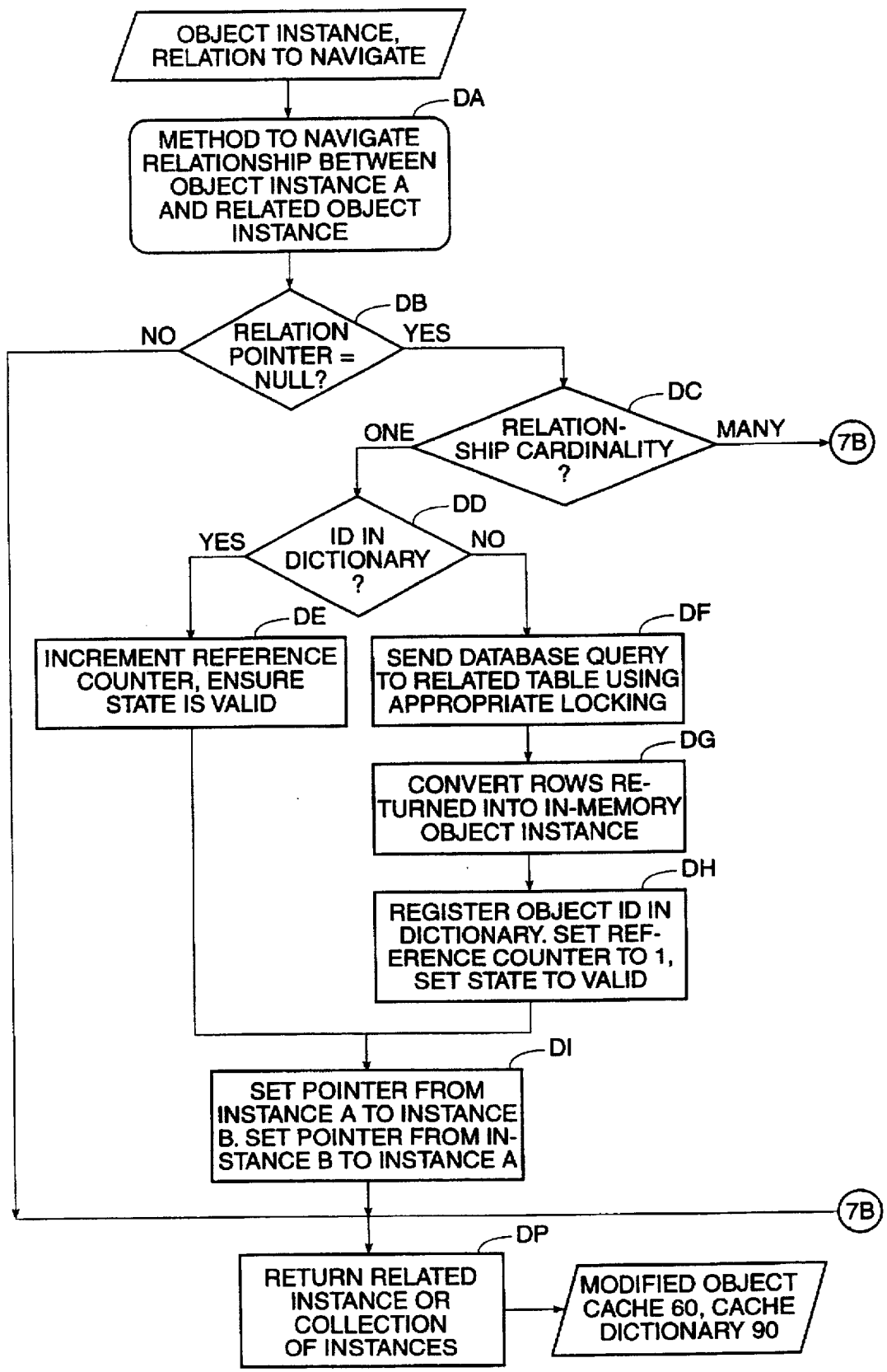
FIG. 7A and FIG. 7B are a flow chart representing the process for navigating a relationship between two instances in the object cache.
Figure 7B:
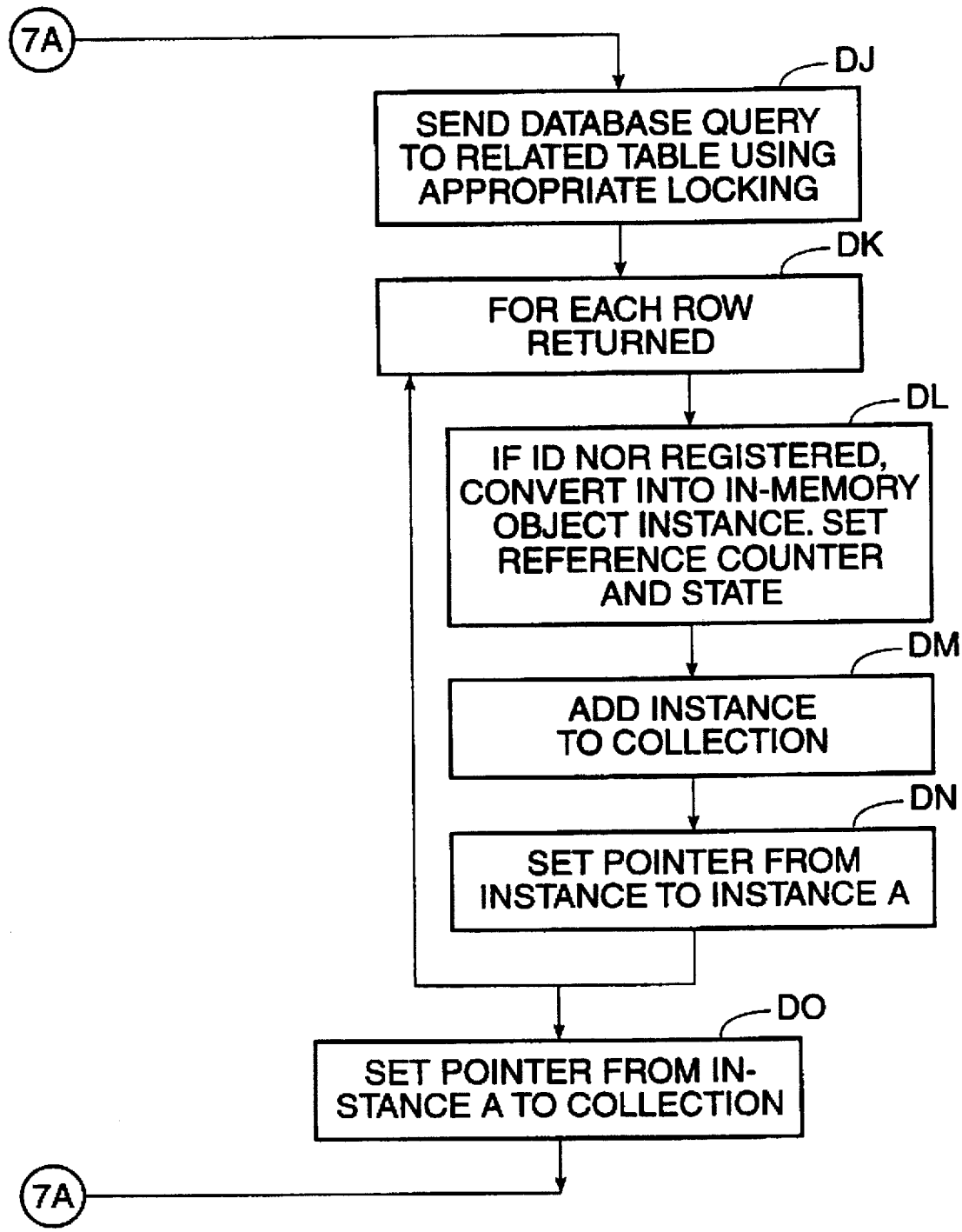

More specifically, as shown in FIG. 7A and FIG. 7B the method of the invention accepts a request from the object-oriented application to navigate a particular relationship for a particular input object instance (Step DA). For example, this can be a request to navigate the relationship between a given employee and the employee's department, e.g., a request to retrieve the department that employee Jane Smith works in. As another example, this can be a request to navigate the relationship between a department and all of its employees, e.g., a request to retrieve all the employees who work in the San Mateo department.

The method first determines whether the relationship pointer attribute for the object instance given as input is set to NULL (Step DB). If the pointer is not NULL, this indicates that the related object instance or collection of instances that are to be retrieved is already in the object cache (e.g., has already been returned in response to a prior query to the structured database 70). In this case, the method simply returns a reference to the related instance or collection of instances (Step DP), thereby avoiding having to query the structured database again for this information.

If the pointer is NULL, this indicates that the relationship information has not yet been read from the database. In this case, the method determines the cardinality of the relationship (Step DC). That is, the method determines the maximum number of object instances that can be related to the input object instance. In particular, the input object instance can be related a maximum of one other object instance, implying that the relationship pointer will refer to a single object instance, or to a maximum of many (i.e., more than one) other object instances, implying that the relationship pointer will refer to a collection of related object instances. For example, in FIG. 2, the Jane Smith employee instance 211 can be related to a maximum of one department instance, for example, through a relationship pointer 217 which refers to the San Mateo department instance 201, whereas the San Mateo department instance 201 can be related to a maximum of many employee instances, for example, through its relationship pointer 206 which refers to employee collection 207 of employee instances 211 and 218.

Continuing in FIG. 7A, if the cardinality of the relationship is one, the method first determines whether the object instance is already in object cache 60 by performing a lookup on cache dictionary 90 (Step DD). This lookup can, for example, take the form of a lookup in a hash table. The result of this lookup is either a reference to an existing object instance in the object cache which corresponds to the object ID used in the lookup, or a NULL value, which indicates that the requested object instance is not present in the cache. The object instance in the dictionary, if any, could have been returned from a previous, unrelated query. Thus the dictionary lookup, if successful, saves a query to the structured database.

In the case that the lookup is successful (Step DE), the method increments a reference counter associated with the object instance returned by the dictionary lookup, and checks the object instance state, retrieving the appropriate data from the structured database if the state is flushed. Step DE is substantially identical to steps CC through CG of FIG. 5.

In the case that relationship cardinality is one and the dictionary lookup is unsuccessful, the method queries the structured database to retrieve information that will be used to add a new object instance to the object cache (Step DF). The query is performed using the default locking mode as specified by the most recent begin transaction request. The query is based on an understanding or mapping between relationships between object instances in the object cache and how these relationships map to primary and foreign keys in the structured database. For example, in FIG. 2, the relationship between department instance 201 and its related employee instances 211 and 218 maps to foreign key column 231 ("DeptID") of table 228 in structured database 70. That is, the DeptID column 231 of employee table 228 provides an implicit pointer between each row of employee table 228 and a corresponding row in department table 225. To retrieve the department instance related to Jane Smith employee instance 211, for example, the method sends a query such as the following:

SELECT*FROM department WHERE DeptID='5'

This query returns the information for the San Mateo department instance from department table 225. More generally, the method creates the appropriate query based on a pre-existing mapping between the object instances and relationships and the corresponding information in the database.

Continuing further in FIG. 7A, the method converts the row or rows returned from the query into a new object instance in object cache 60 (Step DG). This new object instance is then registered in cache dictionary 90, its reference counter is set to 1, and its state is set to valid (Step DH).

Once the object instance is retrieved, the pointers between the object instance and the object instance to which it is related are set (Step DI). This is the "key swizzling" operation which converts the implicit foreign keys in the structured database into pointers between object instances in the object cache. According to the invention, subsequent navigational requests will be resolved by following these pointers rather than by making additional database queries. It will be appreciated by those of skill in the art that setting bi-directional pointers enables the relationship to be traversed from either side after performing just one query.

If the cardinality of the relationship is many, the method queries the database to read the appropriate related rows (Step DJ). The query is performed using the default locking mode as specified by the most recent begin transaction request. The query is based on an understanding or mapping between relationships between object instances in the object cache and how these relationships map to primary and foreign keys in the structured database. For example, in FIG. 2, to retrieve the employee instances related to San Mateo department instance 201, for example, the method sends a query such as the following:

SELECT*FROM employee WHERE DeptID='5'

This query returns the information for the Jane Smith and Sue Horn employee instances (employee instances 211 and 218) from employee table 228.

Continuing in FIG. 7B, for each row returned from the query (Step DK), the method first determines whether an object instance corresponding to this row has already been registered in cache dictionary 90 (Step DL). If the object instance has already been registered, this indicates that it is already in the object cache, and its reference counter is incremented. If the object instance has not been registered, a new object instance is added to the object cache and registered in the cache dictionary, its reference counter is set to 1, and its state is set to valid.

Next, the related object instance (that is, the object instance that was already registered or newly added in step DL) is added to a collection of object instances related to the input object instance (Step DM). A pointer is set from the related object instance to the input object instance (Step DN).

After all of the related object instances created as a result of the query to the structured database have been added to the collection, a pointer is set from the input object instance to the collection (Step DO). This is another instance of the "key swizzling" operation which converts the implicit foreign keys in the structured database into pointers between object instances in the object cache. According to the invention, subsequent navigational requests will be resolved by following these pointers rather than by making additional database queries.

Once the pointers have been appropriately set, the method returns a reference to the related instance or collection of instances (Step DP).

8. Object Reference Deletion

Figure 8:
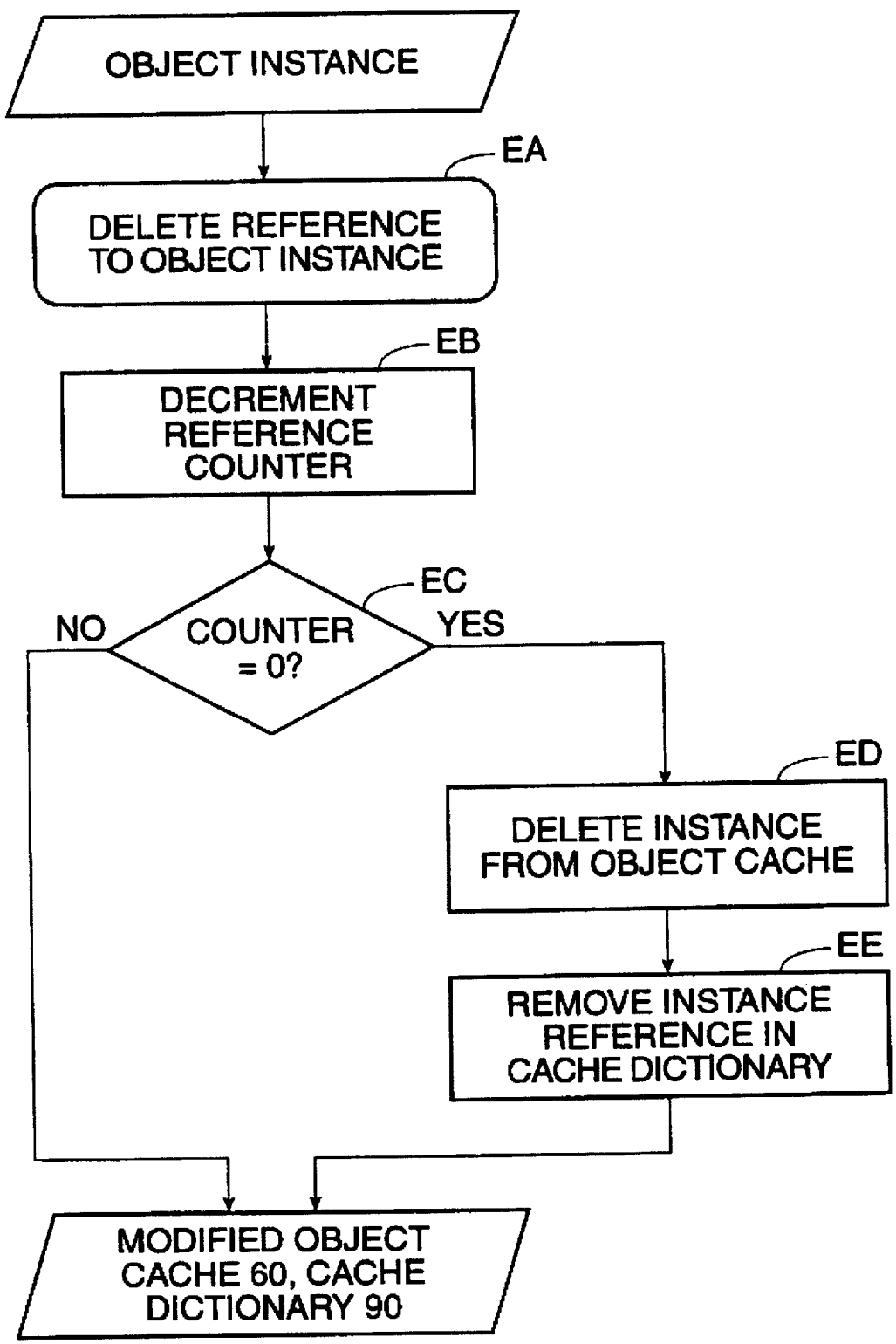
FIG. 8 is a flow chart representing the process for deleting a reference to an object instance in the object cache.

FIG. 8 illustrates the process for deleting a reference to an input object instance which is in object cache 60 (Step EA). The method first decrements the reference counter for the input object instance (Step EB). Next, the method determines whether the decremented reference counter has a value of zero, indicating that no program variables in object-oriented application 80 reference this object instance (Step EC).

If the value is zero, the method deletes the object instance from object cache 60 (Step ED), for example, by freeing program memory allocated to this object instance (e.g., in C++, using the delete operator). The delete operation does not affect the information in the structured database; that is, the delete operation affects the state of the object cache only. After the object instance is deleted, its corresponding reference in cache dictionary 90 is removed as well (Step EE), for example, by removing an entry from a hash table.

If the value of the decremented reference counter is not zero, this indicates that there are still variables in the object-oriented application which depend on the input object instance. Consequently, the object instance is not deleted from the object cache.

9. Committing a Transaction

Figure 9:
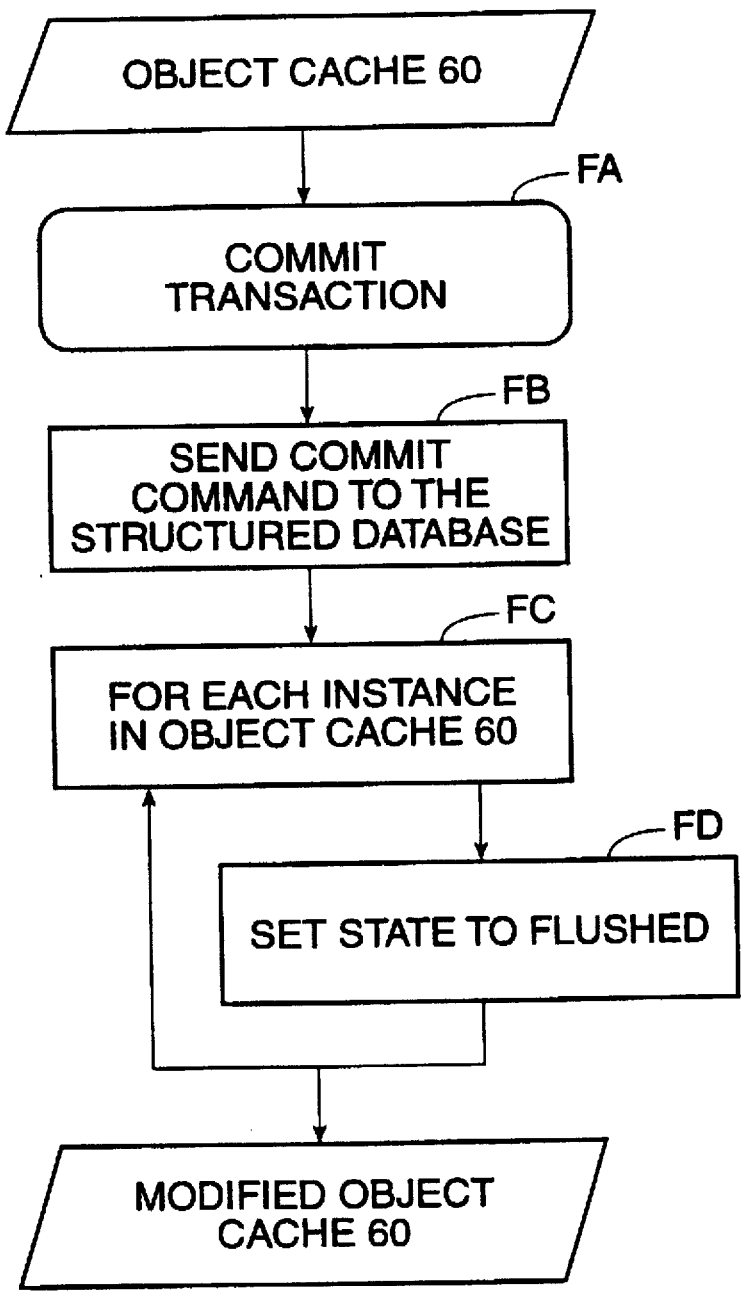
FIG. 9 is a flow chart representing the process for committing a transaction in a structured database.

FIG. 9 illustrates the process for committing a transaction (Step FA). First, the method sends a commit command to the structured database 70 (Step FB). For example, in a relational database, the command COMMIT will cause the database to make permanent all changes which have been made since the last commit command was sent. The commit command to the database also causes all of the locks which have been set by object-oriented application 80 to be released. Therefore, there is a danger that other applications that are also in communication with the database can begin to change in the database information that is represented in the object cache. This can cause object instances in the object cache to contain data that is inconsistent with the data in the database, thereby compromising the integrity of the object-oriented application itself.

After issuing the commit command, the method performs a loop for each object instance in the object cache (Step FC), for example, by using cache dictionary 90 to obtain a reference for each object instance in object cache 60. For each object instance in the cache, the state of the object instance is set to a value of flushed (Step FD). This indicates that the data in the object instance is not guaranteed to be consistent with the corresponding information in the structured database. Typically, the object application re-reads the information for a flushed object instance and reacquires the appropriate locks in the database before using the object instance in any further processing.

10. Conclusion

The method and apparatus of the invention provide a cohesive data structure, called an object cache, that represents information retrieved from a structured database in a form suitable for use by one or more object-oriented applications. Object-oriented applications that use or incorporate an object cache according to the invention can reduce their volume of database queries as compared with similar applications that do not use the cache, and thus can benefit from improved performance. Because the cache provides a unified, cohesive structure in which all information retrieved from the database is stored, certain types of requests by the object-oriented application or applications can be performed in the cache rather than in the database, thereby speeding performance.

The object cache simplifies data management, because all information retrieved from the database is stored in one place. In particular it is possible to "register" the items in the cache to prevent having two copies of the same item present in the application. Additionally it is possible to ensure that items in the cache are locked appropriately in the database during a transaction, so that a user is guaranteed that the data in the cache is consistent with the data in the database. When a database transaction is committed, the database locks are released, allowing other users to access and change the database information. To ensure that the cache remains consistent with the database across transactions, data associated with an object instance in the cache can be flushed when a transaction is committed. A mechanism is provided for transparently re-reading the data for object instances in the cache as required by the application, thereby reacquiring the locks.

The object cache of the invention adds the notion of state to relational and other structured databases, so that subsequent requests can benefit from previous information retrieval. Bi-directional pointers between objects in the object cache provide for reusability of database information. In effect, the object cache eliminates a level of indirection that is present in prior art systems and methods.

The invention has been explained with reference to specific embodiments. Other embodiments are contemplated without departing from the spirit and scope of the invention. For example, the invention can be used not only with relational data, but also any field-delimited data, such as spreadsheet databases, hierarchical databases or flat file databases which are field delimited. In some embodiments of the invention, a single object cache is shared among multiple object-oriented applications. In other embodiments of the invention, an object-oriented application with an object cache can communicate with multiple databases, transparently to the developer or user of the object-oriented application. In still other embodiments of the invention, the cache dictionary and reference counters can be omitted. In yet other embodiments of the invention, applications that are not themselves object-oriented but that work with a structured database can use cohesive data structure analogous to an object cache in which pointers or other explicit references are maintained between elements that store information (and multiple copies of information) retrieved from the database, thereby rendering explicit relationships that are represented only implicitly through foreign keys in the database itself. Still further variations and extensions will be apparent to those of skill in the art within the scope of the invention. It is therefore not intended that this invention be limited, except as indicated by the appended claims.

What is claimed is:

1. In an object-oriented application being executed in a digital computing system comprising a processor, a method for managing information, said information comprising a plurality of object instances, each object instance in said plurality comprising a unique object ID, attributes, and relationships retrieved from a structured database, said method comprising the steps of:

executing instructions on said processor to construct a plurality of object instances based on information retrieved from queries to said structured database, said structured database comprising foreign keys, primary keys, tables, rows and columns;

executing instructions on said processor to construct a unique object ID for each of said object instances, said object ID comprising information extracted from said keys associated with the object instance, in order to provide a mapping between said object instance and at least one row in said structured database;

executing instructions on said processor to construct a single cohesive object cache comprising all object instances of said plurality of object instances and at least one relationship between two objects; and executing instructions on said processor to construct a cache dictionary, said cache dictionary containing said object ID and location of every object instance in said object cache.

2. The method of claim 1 wherein said object instance further comprises at least one reference from said application to one of said plurality of object instances; and further comprising the step of executing instructions on said processor to delete said reference to an object instance having an object ID.

3. The method of claim 2 wherein said step of executing instructions on said processor to delete a reference to an object instance having an object ID comprises:

executing instructions on said processor to decrement a reference counter in said object instance, said reference counter reflecting the number of references from said application to said object instance; and if said reference counter is equal to 0, executing instructions on said processor to delete said object instance and to delete said object ID and said location associated with said object instance from said cache dictionary.

4. The method of claim 1 further comprising the steps of:

executing instructions on said processor to generate a request in said object-oriented application;

executed instructions on said processor to determine whether said request can be resolved with reference to said object cache and without reference to said structured database;

if said request can be resolved with reference to said object cache and without reference to said structured database, executing instructions on said processor to resolve said request by referring to said object cache; and if said request cannot be resolved with reference to said object cache and without reference to said structured database, executing instruction on said processor to resolve said request by querying said structured database to obtain information required to construct an object instance and a relationship pointer from said object instance to a related object instance, modifying said object cache according to said information, and referring to said object instance in said modified object cache.

5. The method of claim 4 wherein said step of executing instructions on said processor to resolve said request by referring to said object cache further comprises executing instructions on said processor to perform a lookup in said cache dictionary which returns a reference to an object instance in said object cache, and further increments a reference counter in said object instance.

6. The method of claim 1 further comprising the step of executing instructions on said processor to retrieve from said object cache an object instance having an object ID, said object ID encapsulating information representing a mapping between said object instance and said structured database.

7. The method of claim 6 wherein the step of executing instructions on said processor to retrieve from said object cache a reference to an object instance having an object ID further comprises the steps of:

executing instructions on said processor to perform a lookup in said cache dictionary, said lookup being based on the object ID of an object instance to be retrieved from said object cache;

if said lookup returns a reference to an object instance in said object cache whose object ID is the same as the object ID of the object instance to be retrieved, executing instructions on said processor to increment a reference counter related to said object instance and to return a reference to said object instance;

if said lookup does not return a reference to an object instance in said object cache, executing instructions on said processor to query said structured database based on said object ID to retrieve information comprising at least one column of said structured database, to construct a new object instance using said information thus retrieved, said new object instance having an object ID, said new object instance having a reference counter set to 1, to register the object ID for said new object instance in said cache dictionary, and to return a reference to said new object instance.

8. In an object-oriented application being executed in a digital computing system comprising a processor, a method for managing information, said information comprising a plurality of object instances, each object instance in said plurality comprising a unique object ID, attributes, and relationships retrieved from a structured database, said method comprising the steps of:

executing instructions on said processor to construct a plurality of object instances based on information retrieved from queries to said structured database, said structured database comprising foreign keys, primary keys, tables, rows and columns;

executing instructions on said processor to construct a unique object ID for each of said object instances, said object ID comprising information extracted from said keys associated with the object instance, in order to provide a mapping between said object instance and at least one row in said structured database;

executing instructions on said processor to construct a single cohesive object cache comprising all object instances of said plurality of object instances and at least one relationship between two objects, by executing instructions on said processor to assign to each said object instance a state, said state having a value indicating whether at least one row in said structured database which corresponds to the information contained in said object instance is currently locked; and executing instructions on said processor to construct a cache dictionary, said cache dictionary containing said object ID and location of every object instance in said object cache.

9. The method of claim 8 further comprising the steps of:

executing instructions on said processor to accept a request from said object-oriented application to begin a database transaction with a default locking mode for subsequent database queries;

executing instructions on said processor to lock certain database rows as specified by said default locking mode as said certain database rows are accessed in retrieving information to be used in the creation of object instances in said object cache;

executing instructions on said processor to accept a request from said object-oriented application to commit a database transaction, said step including executing instructions on said processor to set the state for each object instance in said object cache associated with said transaction to be flushed;

upon accessing an object instance whose state is flushed, executing instructions on said processor to re-read information corresponding to said object instance from said structured database, to reacquire database locks to ensure integrity between said structured database and said object instance, and to set the state for said object instance to valid.

10. In a system comprising a plurality of object-oriented applications and at least one processor, a method for managing information retrieved from a structured database, said method comprising the steps of:

executing instructions on said processor to construct a plurality of object instances based on information retrieved from queries to said structured database, said structured database comprising foreign keys, primary keys, tables, rows and columns;

executing instructions on said processor to construct a unique object ID for each of said object instances, said object ID comprising information extracted from said keys associated with the object instance, in order to provide a mapping between said object instance and at least one row in said structured database; and executing instructions on said processor to construct a single cohesive object cache comprising all object instances of said plurality of object instances and at least one relationship between two object instances of said plurality, said object cache being shared by said object-oriented applications.

11. The method of claim 10 further comprising the steps of:

executing instructions on said processor to accept a request from an object-oriented application of said plurality of object-oriented applications;

executing instructions on said processor to respond to said request using said object cache.

12. In a system comprising an object-oriented application and at least one processor, a method for managing information retrieved from a plurality of structured databases, said method comprising the steps of:

executing instructions on said processor to construct a plurality of object instances based on information retrieved from queries to said structured database, said structured database comprising foreign keys, primary keys, tables, rows and columns;

executing instructions on said processor to construct a unique object ID for each of said object instances in order to provide a mapping between said object instance and at least one row in at least one structured database of said plurality of structured databases; and executing instructions on said processor to construct a single cohesive object cache comprising all object instances of said plurality of object instances and at least one relationship between two objects.

13. An apparatus for an object cache comprising a processor, memory coupled to said processor, a storage device coupled to said processor, an application being executed by said processor, and a structured database coupled to said application, and:

means associated with said processor for constructing a plurality of object instances based on information comprising at least one column retrieved from said structured database, said structured database comprising foreign keys, primary keys, tables, rows and columns, each of said object instances having its own unique object ID in order to provide a mapping between said object instance and at least one row in said structured database;

means associated with said processor for constructing a single cohesive object cache comprising all object instances of said plurality and at least one relationship between two object instances; and means for storing said object cache.

14. The apparatus of claim 13 wherein said means for storing said object cache is selected from the group consisting of physical memory, virtual memory, and hard disk storage.

* * * * *